United States Patent [19]

Becker et al.

[11] 4,246,007
[45] Jan. 20, 1981

[54] SEPARATING GASEOUS OR VAPOROUS SUBSTANCES ACCORDING TO THE SEPARATING NOZZLE PRINCIPLE

[75] Inventors: Erwin-Willy Becker, Karlsruhe; Peter Bley, Eggenstein; Ursula Ehrfeld; Wolfgang Ehrfeld, both of Ettlingen; Ulrich Knapp, Eggenstein, all of Fed. Rep. of Germany

[73] Assignee: Kernforschungszentrum Karlsruhe GmbH, Karlsruhe, Fed. Rep. of Germany

[21] Appl. No.: 967,711

[22] Filed: Dec. 6, 1978

[30] Foreign Application Priority Data

Dec. 6, 1977 [DE] Fed. Rep. of Germany ....... 2754276

[51] Int. Cl.³ ...................... B01D 57/00; B01D 51/08
[52] U.S. Cl. .......................................... 55/17; 55/277
[58] Field of Search ................................... 55/17, 277

[56] References Cited

U.S. PATENT DOCUMENTS

| 3,708,964 | 1/1973 | Becker et al. | 55/17 |
| 3,877,892 | 4/1975 | Bley et al. | 55/17 |
| 3,989,483 | 11/1976 | Becker et al. | 55/17 |

FOREIGN PATENT DOCUMENTS

| 1052055 | 11/1959 | Fed. Rep. of Germany | 55/71 |
| 1096875 | 7/1961 | Fed. Rep. of Germany | 55/71 |
| 1198328 | 4/1966 | Fed. Rep. of Germany | 55/71 |

OTHER PUBLICATIONS

KFK Report 2138, Mar. 1975, by Kernforschungszentrum Karlsruhe, Published by Gesellschaft für Kernforschung mbh. p. 37 et seq.
KFK Report 1440, Aug. 1971, by Kernforschungszentrum Karlsruhe, published by Gesellschaft für Kernforschung mbh.

Primary Examiner—Charles N. Hart
Assistant Examiner—E. Rollins Cross
Attorney, Agent, or Firm—Spencer & Kaye

[57] ABSTRACT

In order to separate gaseous or vaporous substances having different molecular weights and/or different gas kinetically effective cross sections, by conducting the mixture to be separated together with a lighter additive gas into a separating chamber through two slit-shaped nozzles to form, in the chamber, two jets which are directed toward, and deflect, one another, the flow lines of each jet converging in the flow direction, dividing the thus deflected jets by means of separating baffles into partial streams of respectively different compositions, and discharging the partial streams separately from the chamber.

10 Claims, 5 Drawing Figures

SEPARATING GASEOUS OR VAPOROUS SUBSTANCES ACCORDING TO THE SEPARATING NOZZLE PRINCIPLE

BACKGROUND OF THE INVENTION

The present invention relates to a method and apparatus for separating gaseous or vaporous substances having different molecular weights and/or different gas kinetically effective cross sections, particularly isotopes, in which the mixture to be separated is conducted, together with a lighter additive gas, through two slit-shaped nozzles in the form of jets which are directed toward one another so as to be mutually deflecting, the jets thus entering a separating chamber and the thus deflected jets being separated into partial streams of respectively different compositions by means of separating baffles and being discharged separately, the lines of flow of the mixture to be separated converging radially during introduction into the separating chamber.

The principle of the so-called separating nozzle method is disclosed in German Pat. No. 1,052,955 and is based on the spatial partial separation of a jet expanding from a nozzle-like opening into a low pressure chamber at subatmospheric pressure. German Pat. No. 1,096,875 discloses advantages that can be realized in the practice of this method by addition of a light additive gas with a mole excess to the mixture to be separated and by using, if required, at least two converging gas streams.

German Pat. No. 1,198,328 teaches that the separating properties of an arrangement can be improved by mechanically deflecting the jet leaving the nozzle on its path toward the separating baffle by means of a curved wall so as to make the curvature of the flow lines and the size of the angle of deflection greater than would be possible in the expanding jet. The curvature of the flow lines produces a centrifugal field as a result of which the partial stream formed in the vicinity of the wall is heavier than that formed at a greater distance from the wall. The curved deflecting wall, however, produces friction losses which may reduce the separating effect.

An explanation of the generic process is given in the KFK Report 2138 of March 1975 by Kernforschungszentrum Karlsruhe published by Gesellschaft für Kernforschung mbH. In it, it is stated, inter alia, that with jet-jet systems of this type, there may appear two completely different flow configurations, i.e. the desired, mirror symmetrical jet-jet deflection changes, above certain "critical" parameters, and a configuration in which the jets slide one on top of the other at a small mutual angle, as described at pages 37 et seq. of the above-cited report. This sudden conversion of the flow configuration is associated with a sudden drop in separation.

It has been found, as explained at pages 40 et seq. of the above-cited report, that this flow instability is associated with the fact that the mixture, e.g. $UF_6$, which has been accelerated by the lighter additive gas, retains, due to its high inertia, approximately its original direction of flow even after leaving the opening of the nozzles, i.e. after passing through the most constricted point of the facing nozzles. That is, the $UF_6$ flow lines continue to converge in a radial pattern even after leaving the opening of the nozzles so that a sharply bundled, or concentrated, $UF_6$ jet is produced. This bundling and thus this tendency of mutual deflection of oppositely directed jets is reinforced by an increase in the limitation angle from 18° to 30°. It was thus decided not to further increase this limitation angle.

Due to these instabilities it was impossible, during prior studies, to realize any technological or economic improvements compared to other prior art separating nozzle systems. This was the more regrettable since it had also been found in these studies that a jet-jet separating system tends to be less subject to annoying dust deposits than arrangements provided with a fixed deflection wall.

SUMMARY OF THE INVENTION

It is an object of the present invention to create, in a flow arrangement of the above-described type, a stable, mirror symmetrical flow configuration under operating conditions which enable a jet-jet separating nozzle system to operate more economically than prior art separating nozzle systems.

These and other objects are achieved, according to the present invention in a method and apparatus for separating gaseous or vaporous substances having different molecular weights and/or different gas kinetically effective cross sections, particularly isotopes, which includes conducting the mixture to be separated together with a lighter additive gas into a separating chamber through two slit-shaped nozzles to form, in the chamber, two jets which are directed toward, and deflect, one another, the flow lines of each jet converging in the flow direction, dividing the thus deflected jets by means of separating baffles into partial streams of respectively different compositions, and discharging the partial streams separately from the chamber, by causing the flow lines of each jet to converge, at least in the region of the outlet opening of each nozzle, at a limiting angle of more than 30°.

The present invention is based on the unexpected discovery that a tendency of the jets to suddenly mutually slide over each other not only does not increase further, but gradually decreases again, when the flow lines of the mixture to be separated converge at least in the region of the nozzle opening at a limiting angle of more than 30° and that when this limiting angle is increased to more than 30°, in spite of the reduction of the extraction cross sections for the partial streams which have already been separated, there is a surprising improvement in economy of operation. In connection with the invention, the term "region of the nozzle opening" designates the area upstream of the nozzle opening to a distance equal to four times the width of the nozzle opening.

Significant advantages are obtained already with an increase in the limiting angles to 45°. Better results yet can generally be obtained with angles of between 60° and 90°.

DESCRIPTION OF THE PREFERRED EMBODIMENTS

Figure 1:
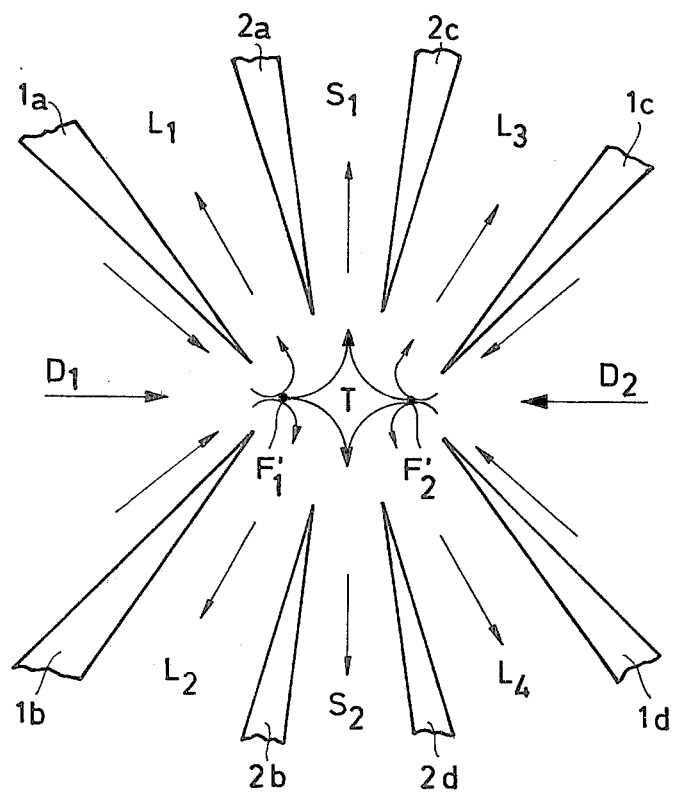
FIG. 1 is a schematic pictorial representation of a preferred embodiment of a separating nozzle element according to the invention which produces intensive bundling of the jet near the nozzle opening.

The separating nozzle element shown in a cross-sectional view in FIG. 1 and extending transversely perpendicular to the plane of the drawing includes two mirror symmetrically opposing nozzles for the supply of streams $D_1$ and $D_2$ composed of the mixtures to be separated and of the additive gas, into separating chamber T, two separating channels for the heavier partial streams $S_1$ and $S_2$, and four separating channels for the lighter partial streams $L_1$, $L_2$, $L_3$ and $L_4$, the plane of symmetry of the separating channels being perpendicular to the plane of symmetry of the supply nozzles. The nozzles and channels are formed by baffles 1a, 1b, 1c, 1d and 2a, 2b, 2c, 2d whose free ends surround the separating chamber T.

The baffle 1a is set relative to baffle 1b, and baffle 1c is set relative to baffle 1d, at respective angles which are such that the limiting, or boundary, angles of the flow lines from each nozzle are greater than 30°. The two points $F_1'$ and $F_2'$ in chamber T constitute the virtual focal points which would result for individual operation of each nozzle, i.e. without mutual deflection of the jets. Each focal point is closer to its respective associated nozzle opening than to the oppositely disposed nozzle opening. Such a positioning of the focal points contributes to the prevention of instabilities.

Figure 2:
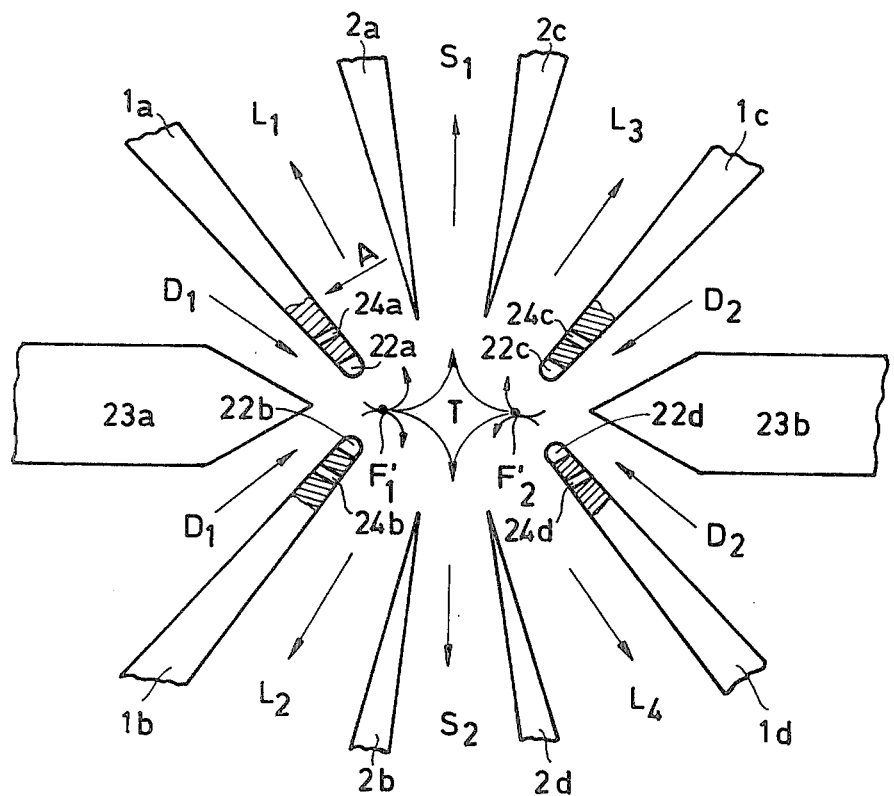
FIG. 2 is a view similar to that of FIG. 1 of another embodiment of the invention with flow dividers between the nozzle baffles.
Figure 2A:
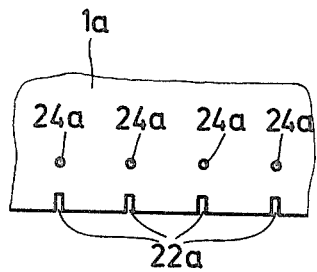
FIG. 2a is a sectional top view in direction of arrow "A" of FIG. 2 of a nozzle.

In the embodiment shown in FIG. 2, flow dividers 23a and 23b are provided between the nozzle baffles 1 in the central inflow region of each nozzle. Thus the individual flow lines of the oppositely directed jets are subjected on the average to a greater deflection angle. It has further been found to be of advantage in some cases to equip the nozzle baffles 1a, 1b, 1c and 1d with connecting channels 24a, 24b, 24c and 24d, respectively, leading to the discharge channels for the lighter partial streams and/or to provide a toothed profile 22a, 22b, 22c or 22d at the rounded end of each of those baffles which faces the separating chamber T. These help to avoid instabilities even if the operating conditions deviate extensively from desired values. FIG. 2a shows a sectional top view in direction of arrow A of FIG. 2 of a nozzle limiting baffle (1a) provided with a toothed profile at the end adjacent the separation chamber. The free space (22a) between the teeth is typically one half of the nozzle opening, and its depth is typically equal to the nozzle opening. The width of the teeth is typically three times the nozzle opening. The diameter of the connecting channels (24a) is typically one half of the nozzle opening, the distance between each other is typically three times the nozzle opening and their distance from the end adjacent the separation chamber is typically one half of the nozzle opening.

Figure 3:
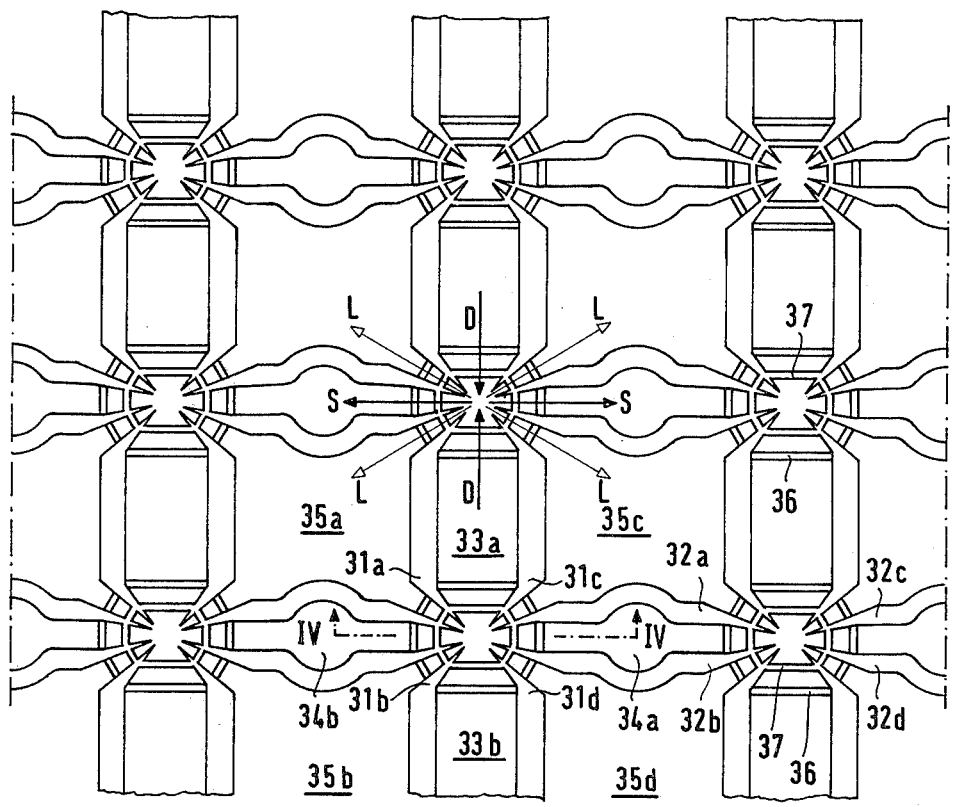
FIG. 3 is a view of a net-like structure according to the invention, with a plurality of parallel connected separating nozzle elements.

In FIG. 3 a plurality of parallel connected separating nozzle elements form the nodes of a network combined of pairs of baffle sets 31a, 31b, 31c, 31d, and 32a, 32b, 32c, 32d whose ends form the nozzle openings and discharge channel inlets. The gaps between the nozzle baffles 31a and 31c and between 31b and 31d are widened to form inlet lines 33a and 33b which extend perpendicular to the plane of the network and which are each associated with two adjacent separating nozzle elements. In a corresponding manner, the discharge channels 34a and 34b for the heavier partial streams S are are formed between baffles 32a and 32b and between baffles 32c and 32d. The discharge channels 35a, 35b, 35c and 35d for the lighter partial streams L are each associated with four adjacent separating nozzle elements. With such an arrangement it is possible to produce a very compact device. It is, of course, also possible to provide the separating nozzle elements separately with supply and discharge lines.

Figure 4:
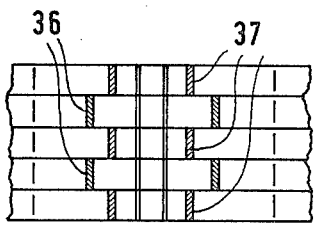
FIG. 4 is a cross-sectional view along the line IV—IV of FIG. 3.

In order to form the slit-shaped nozzles and channels, the arrangement may be assembled of a stack of mutually aligned plates or foils provided with the network structure. In such a case it is of advantage to mainly connect the peaked ends of the baffles 31 and 32 in the vicinity of the nodes by means of bars 36 and 37 each extending around the associated separating chamber. In order not to interfere with the inlet and exit of the mixture and of the partial streams, transversely adjacent bars are offset in space with respect to one another, as shown in FIG. 4.

Example

An apparatus constructed according to the embodiment of FIG. 1 was constructed so that the convergence angle of the sides of each of the facing individual nozzles formed by plane baffles 1a–1d was 90°. The minimum distance between adjacent inlet baffles 1a and 1b, between inlet baffles 1c and 1d, between separating baffles 2a and 2c, and between separating baffles 2b and 2d was 0.3 mm. The distance between the pair of inlet baffles 1a, and 1b and the diametrically opposed pair of inlet baffles 1c and 1d as well as the distance between the pair of separating baffles 2a and 2c and the pair of baffles 2b and 2d, was 0.8 mm. The length of the slit-shaped arrangements perpendicular to the plane of FIG. 1 was 20 mm.

In this device, a mixture of 4 mol% $UF_6$ ($N_0$=0.04) and 96 mol% $H_2$ were treated for separation of the uranium isotopes. The total gas quantities extracted in light and heavy partial streams had a ratio of 1:0.58 ($\nu_{total}$=0.633) the corresponding $UF_6$ quantities had a ratio of 1:3 ($\nu_u$=0.25). The pressure $P_O$ at which the $UF_6/H_2$ mixture was introduced was set at 22 Torr. The lighter partial streams were expanded by the factor $P_O/P_L$=1.5, where $P_L$ was the outlet pressure of the light partial streams, and the heavier partial streams were expanded by the factor $P_O/P_s$=1.12, where $P_s$ was the outlet pressure of the heavy partial streams. The resulting elementary effect of separation of the uranium isotopes was $\epsilon_A$=10.15 per thousand.

The above data correspond to a specific energy consumption $E_s$ of $0.773 \times 10^6$ RT or, assuming an operating temperature of T=310 K, the specific energy consumption is 2300 kWh/kg SWU. The specific energy consumption was obtained by the following formula $$E_s = \frac{2RT}{\epsilon_A^2 \theta_u (1-\theta_u) \cdot N_0} (\theta_{total} \ln \frac{P_o}{P_L} + (1-\theta_{total}) \ln \frac{P_o}{P_s}),$$

where

R = the universal gas constant

T = the absolute temperature.

The specific energy consumption could thus be reduced by the solution of the present invention to 60% of the value quoted in the above-cited KFK Report 2138, Table 2, page 32, for an $H_2/UH_6$ mixture containing 5 Mol% $UF_6$.

The angle of limitation of the radially converging flow lines of the mixture to be separated upon entry into the separating chamber, in certain arrangements according to the invention, will result from the configuration of the delimiting walls of the individual nozzles. The same applies for the determination of the geometric positions of the locations of maximum jet focusing. In such embodiments, where the determination of the limiting angles or of the focal points is not easily possible, e.g. because of curved or angled nozzle baffles, these points can easily be determined by means of known measuring methods, e.g. the molecular probe measuring method described by K. Bier, H. Brandtstädter, U. Ehrfeld, W. Ehrfeld in KFK Report No. 1440, August 1971.

The limiting angles can be measured directly according to the cited measuring method; the focal point of each individual nozzle is measured as that point at which the also directly measurable stream density of the mixture to be separated, i.e. the quantity of the mixture flowing per unit time and area, has its absolute maximum value.

It will be understood that the above description of the present invention is susceptible to various modifications, changes and adaptations, and the same are intended to be comprehended within the meaning and range of equivalents of the appended claims.

What is claimed is:

1. In a method for separating gaseous or vaporous substances having different molecular weights and/or different gas kinetically effective cross sections, which includes conducting the mixture to be separated together with a lighter additive gas into a separating chamber through two slit-shaped nozzles to form, in the chamber, two jets which are coaxial with, directed toward, and deflect, one another, the flow lines of each jet converging in the flow direction, dividing the thus deflected jets by means of separating baffles into partial streams of respectively different compositions, and discharging the partial streams separately from the chamber, the improvement wherein said step of conducting comprises causing the flow lines of each jet to converge, at least in the region of the outlet opening of each nozzle, at a limiting angle of more than 30°.

2. Method as defined in claim 1 wherein the flow lines of each jet converge at a limiting angle of between 45° and 90°.

3. Method as defined in claim 1 wherein the flow lines of each jet converge at a limiting angle of 60°.

4. Method as defined in claims 1, 2 or 3 wherein the said step of conducting is carried out in a manner to direct the two jets against one another in such a manner that the focal point that would result from individual operation of each nozzle lies closer to its associated nozzle than to the oppositely disposed nozzle.

5. In apparatus for separating gaseous or vaporous substances having different molecular weights and/or different gas kinetically effective cross sections according to the jet-jet separating nozzle principle, which apparatus includes means defining two mutually-facing, slit-shaped nozzles presenting respective outlet openings which are spaced from one another for delivering jets of the mixture to be separated, the nozzles being disposed in a mirror symmetrical arrangement to one another and each nozzle being provided with an opposed pair of side walls inclined toward one another in the direction of jet flow in the region of the outlet opening thereof, and means defining discharge channels for removing different partial streams of the mixture delivered by the nozzles, the nozzle outlet openings and the discharge channels delimiting a separating chamber, the improvement comprising two central flow dividers each disposed between said opposed side walls of a respective nozzle.

6. In apparatus for separating gaseous or vaporous substances having different molecular weights and/or different gas kinetically effective cross sections according to the jet-jet separating nozzle principle, which apparatus includes means defining two mutually-facing, slit-shaped nozzles presenting respective outlet openings which are spaced from one another and which are formed to create converging jets of the mixture to be separated, the nozzles being disposed in a mirror-symmetrical arrangement to one another, and means defining discharge channels for removing partial streams having different weights of the mixture delivered by the nozzles, the discharge channels for removing partial streams of lighter weight being disposed adjacent the nozzles, and the nozzle outlet openings and the discharge channels delimiting a separating chamber, the improvement comprising means defining connecting channels between said nozzles and said discharge channels adjacent thereto outside of said separating chamber.

7. In apparatus for separating gaseous or vaporous substances having different molecular weights and/or different gas kinetically effective cross sections according to the jet-jet separating nozzle principle, which apparatus includes means defining two mutually-facing, slit-shaped nozzles presenting respective outlet openings which are spaced from one another for delivering jets of the mixture to be separated, the nozzles being disposed in a mirror symmetrical arrangement to one another and each nozzle being provided with an opposed pair of side walls inclined toward one another in the direction of jet flow in the region of the outlet opening thereof, and means defining discharge channels for removing different partial streams of the mixture delivered by the nozzles, the nozzle outlet openings and the discharge channels delimiting a separating chamber, the improvement wherein said means defining discharge channels comprise a plurality of baffles extending away from said chamber, with the ends of said baffles adjacent said chamber having a toothed profile.

8. In apparatus for separating gaseous or vaporous substances having different molecular weights and/or different gas kinetically effective cross sections according to the jet-jet separating nozzle principle, which apparatus includes at least one separating nozzle unit composed of a plurality of baffles defining two mutually-facing, slit-shaped nozzles presenting respective outlet openings which are spaced from one another and which are formed to create converging jets of the mixture to be separated, the nozzles being disposed in a mirror-symmetrical arrangement to one another, and discharge channels for removing partial streams of the mixture delivered by the nozzles, the nozzle outlet openings and the discharge channel delimiting a separating chamber, the improvement wherein there is a plurality of said units disposed to form nodes of a network, and further comprising means located between said units for supplying the mixture to said nozzles and removing partial streams from said discharge channels along paths perpendicular to the plane of said network.

9. An arrangement as defined in claim 8 wherein said baffles of all of said units comprise a stack of mutually aligned foils extending parallel to the plane of said network, each said foil including bars connecting adjacent baffle portions together, with said bars of each said foil being offset from said bars of said foil immediately adjacent thereto.

10. In apparatus for separating gaseous or vaporous substances having different molecular weights and/or different gas kinetically effective cross sections according to the jet-jet separating nozzle principle, which apparatus includes means defining two mutually-facing, slit-shaped nozzles presenting respective outlet openings which are spaced from one another to delimit opposite boundaries of a separating chamber, the two nozzles being arranged diametrically opposite one another and in a mirror symmetrical arrangement to one another and each nozzle being provided with an opposed pair of side walls inclined toward one another in the direction of jet flow in the region of the outlet opening thereof, for delivering jets of the mixture to be separated toward one another into the chamber, and means defining discharge channels bounding the chamber and including separating baffles for dividing the jets after mutual deflection in the chamber into partial streams of respectively different compositions and for removing such partial streams separately from the chamber, the improvement wherein said side walls of each said nozzle are oriented relative to one another for causing the flow lines of the jet delivered thereby to converge, at least in the region of the outlet opening of said nozzle, at a limiting angle of more than 30°.

* * * * *